W. F. Sherman.

Crucible.

No. 3534.

Reissued Jul. 6. 1869.

Witnesses

C. R. Playle

Lizzie Playle.

Inventor.

William F. Sherman

UNITED STATES PATENT OFFICE.

WILLIAM F. SHERMAN, OF BUCKSPORT, MAINE.

IMPROVED PROCESS OF REPAIRING CRUCIBLES.

Specification forming part of Letters Patent No. 87,075, dated February 16, 1869; Reissue No. 3,534, dated July 6, 1869.

*To all whom it may concern:*

Be it known that I, WILLIAM F. SHERMAN, of Bucksport, in the county of Hancock and State of Maine, have invented a new and useful Improved Mode or Process of Renewing Crucibles; and I do hereby declare the following to be a full, clear, and exact description thereof, reference being had to the accompanying drawing, forming part of this specification, in which—

Figure 1:
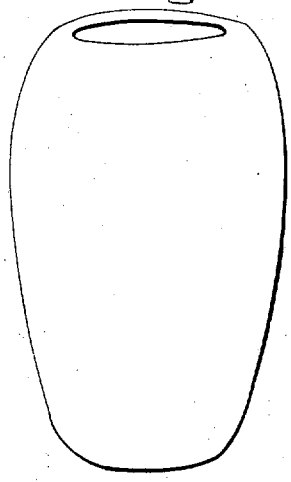
Figure 2:
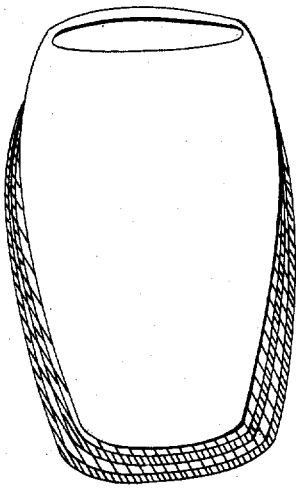

Figure 1 is a representation of a crucible which is new or has been used until unfit for further use. Fig. 2 is a sectional representation of a crucible after being renewed by my process.

Crucibles, such as are employed for melting steel and similar purposes, are usually made of plumbago, (commonly called "black-lead,") and fire-clay, and, as is well known, become worn out and unfit for further use after being exposed to about three heats.

My invention is designed to fit crucibles for standing a greater number of heats without becoming worn out, and to renew them when worn out, so that they may be repeatedly used and last much longer than crucibles not so treated.

My invention consists in applying to the surface of crucibles (either new or old) a thin mixture of plumbago and other substances in water, either by dipping or otherwise, so that the mixture will adhere to and unite with the crucible in thin layers, which will not crack or peel off when exposed to heat.

The difficulty heretofore experienced in renewing old crucibles by applying a coating or plaster of the materials of which they are composed, or other substances, has been that the coating thus given cracks off by the heat, separating from the crucible and uniting to the fuel and slag in the furnace. This difficulty I have entirely obviated, and am able by my process to make new crucibles last much longer than has heretofore been the case, and to renew old crucibles when worn out, so that they will last for from six to twelve heats of a steel-furnace, which is from twice to four times as many heats as they are able to stand without being subjected to my process.

To enable others skilled in the art to use my improvement, I will proceed to describe it more fully.

The principal ingredients which I use in preparing my wash of fluid coating is plumbago, or black-lead, as it is usually called. With this I mix fire-clay and what is called by the workmen "mica sand," or any clean silicious sand. For the fire-clay ingredient I prefer to use equal parts of raw refractory, calcined refractory, raw plastic, and calcined plastic fire-clay. These ingredients may be varied by the use of similar or equivalent substances, but plumbago being the chief ingredient, it alone, or fire-clay alone, or both together, or these substances with other suitable ingredients, may be employed.

Old crucibles ground up may also be used with the other ingredients named in compounding the wash, in which case the proportion of the ingredients composing the wash, as hereinafter described, will remain the same, and the quantity be made up by the old crucibles pulverized, which, in fact, usually contain the ingredients required in varying proportions. These ingredients, after being pulverized, I mix with water (hot or cold) in about the following proportions: Plumbago, forty parts; fire-clay, forty parts; sand, twenty parts—all by weight—to which, if so desired, about twenty parts of old crucible material may be added. The exact proportion is not material and should be varied according to the quality of the sand and clay used, or according as one or another of the last-named ingredients are omitted or others added. These are mixed with the water to about the consistence of ordinary white-wash or thick cream. The crucibles, either new, partly worn, or worn out, are then dipped in this fluid mixture, or otherwise washed or coated with it, and are then set to dry, about one-sixteenth of an inch adhering to the surface of the crucible. If the crucibles have been used they will be covered with a vitreous skin or crust which should be removed before dipping, otherwise the wash or coating will not properly adhere. The vitreous skin may be easily removed by slight taps with any suitable tool. This dipping or washing is repeated, after each coat is sufficiently dry, as often as may be necessary to give the desired thickness of coating.

Crucibles should be renewed by such treatment after each heat, thus adding to the crucible at each treatment about the amount lost during the last preceding heat.

Having thus described my improvement, what I claim as my invention, and desire to secure by Letters Patent, is—

1. The process of coating new or renewing old crucibles by repeated applications of a thin coating of a mixture composed of plumbago and other refractory substance or substances, substantially in the manner and for the purposes described.

2. The mixture in water of plumbago with refractory clay, sand, or other similar refractory substances, as a wash for coating and renewing crucibles in the manner substantially as hereinbefore described.

In testimony whereof I have hereunto set my hand.

W. F. SHERMAN.

Witnesses:

A. S. NICHOLSON,
G. H. CHRISTY.